United States Patent [19]
Benson et al.

[11] Patent Number: 5,813,008
[45] Date of Patent: Sep. 22, 1998

[54] SINGLE INSTANCE STORAGE OF INFORMATION

[75] Inventors: Max L. Benson; Darren A. Shakib, both of Redmond, Wash.

[73] Assignee: Microsoft Corporation, Redmond, Wash.

[21] Appl. No.: 678,995

[22] Filed: Jul. 12, 1996

[51] Int. Cl.⁶ ........................................................ G06F 17/30
[52] U.S. Cl. ............................................. 707/10; 707/104
[58] Field of Search ..................................... 395/601, 611, 395/612, 613, 614, 615, 616, 680, 701, 200.1, 200.2, 200.3; 370/397

[56] References Cited

U.S. PATENT DOCUMENTS

| | | | |
|---|---|---|---|
| 4,914,583 | 4/1990 | Weisshaar et al. | 395/680 |
| 4,914,586 | 4/1990 | Swinehart et al. | 395/612 |
| 5,014,192 | 5/1991 | Mansfield et al. | 395/601 |
| 5,146,216 | 9/1992 | Deluca et al. | 340/825.52 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,418,957 | 5/1995 | Narayan | 395/701 |
| 5,550,816 | 8/1996 | Hardwick et al. | 370/397 |
| 5,579,444 | 11/1996 | Dalziel et al. | 395/94 |
| 5,625,818 | 4/1997 | Zarmer | 395/615 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Primary Examiner—Thomas G. Black
Assistant Examiner—Ruay Lian Ho
Attorney, Agent, or Firm—Workman, Nydeger & Seeley

[57] ABSTRACT

Information items commonly have a unique portion and a common portion that is the same for multiple items. The common portions of information items are stored once. Each common portion is assigned a globally unique single-instance identifier. Each unique portion of an information item stores the single-instance identifier of the associated common portion. A reference count, stored with the common portion, reflects the number of unique portions associated with the common portion. When an information item is created or distributed, the single-instance identifier of the common portion is used to ensure that multiple copies of the common portion are not stored.

28 Claims, 6 Drawing Sheets

SINGLE INSTANCE STORAGE OF INFORMATION

BACKGROUND OF THE INVENTION

The invention relates to storing electronic information items.

As society moves into the information age, there are an ever-increasing number of information items that are electronically stored, copied, moved, modified, and distributed. The information items (e.g., database records) often consist of a unique portion and a common portion that is the same for multiple information items. An electronic mail ("e-mail") message is an example of an information item. The unique portion of an e-mail message may include the recipient, read/unread status, and time created. The common portion may include the body of the e-mail message or attachments to the message. An e-mail message may be stored in multiple locations, copied, moved, and distributed to other e-mail mailboxes on one or more storage units without changing the main body of the message (the common portion). However, each copy, move, and distribution may create a new unique portion, e.g., when a message is copied to a location on a different storage unit.

In current information storage systems, the common portion and unique portion of an information item may be associated by an identifier. When the unique portion of an information item changes, the common portion may be copied and associated with the new unique portion. As a result, multiple copies of the same common portion may be stored. Therefore, present storage schemes may cause the information storage units to fill up with redundant data, i.e., multiple copies of the common portion.

Some information storage systems use the identifier to prevent multiple copies of the common portion from being stored on the same storage device or within a single application. However, these systems do not ensure that multiple copies of the common portion are not stored across a network of storage devices.

One approach to providing adequate information storage capacity is to increase the size of available information storage. However, increasing the size of information storage increases the cost, and may also increase the access time to recall the stored information and increase the complexity of the information storage system.

SUMMARY OF THE INVENTION

The present invention avoids storing multiple copies of common portions on a network of storage devices, e.g., a plurality of servers connected on a distributed network, by assigning single-instance identifiers to the common portion of information items. The single-instance identifier for each common portion is unique across the plurality of servers. The single-instance identifier of a common portion is associated with each unique portion that is associated with the common portion. In this way, more than one unique portion can access the same common portion without storing separate copies of the common portion. This single-instance storage scheme eliminates redundant data across the plurality of servers, freeing more storage space.

For example, in an e-mail system, when a user's mailbox is moved to a new server, the single-instance identifiers of the messages in the moved mailbox are compared to a table of single-instance identifiers associated with messages already stored on the new server, and copies are made of only the common portions for which a copy is not already stored on the new server.

Each common portion (or "single instance portion") has a reference count which reflects the number of unique portions that reference it. The reference count is adjusted each time a unique portion is associated or dissociated with the common portion. If the reference count reaches zero, the common portion can be deleted, freeing additional storage space. Preferably, common portions that have a reference count of zero are not deleted immediately, as experience teaches that new unique portions are likely to be created that reference the common portion. Therefore, delaying the deletion of the common portion may avoid the expense of creating a new copy of the common portion.

The invention may be implemented in a variety of database and database management applications, including electronic messaging systems (e.g., Microsoft® Exchange). The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
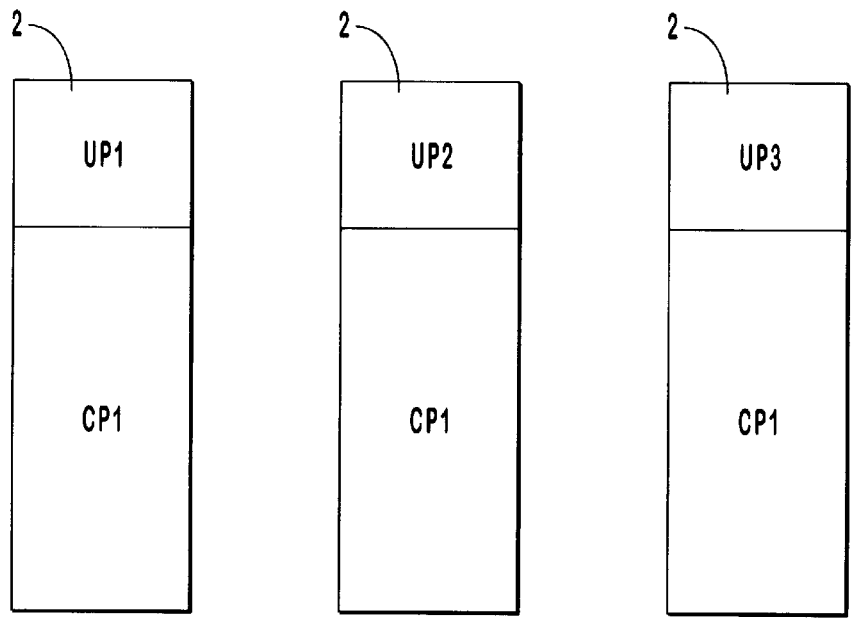
FIG. 1 is a block diagram of a prior art scheme for storing information items.

A block diagram of several information items 2 are shown in FIG. 1. Each information item 2 includes a unique portion ("UP") and a common portion ("CP"). Various types of information that are commonly used in databases and messaging systems may be stored as unique and common portions. For example, a unique portion and common portion may form a database record.

The information stored as a unique portion includes information that is unique to the information item 2 only. For example, the three information items 2 shown in FIG. 1 have different unique portions, UP1, UP2, and UP3. However, all of the information in a unique portion 3 need not be unique to item 2. The information stored as a common portion, e.g., CP1, may also be found in other information items. For example, FIG. 1 shows that all three information items 2 have the same common portion CP1.

In existing information storage schemes, common portion CP1 may be stored separately with each unique portion UP1, UP2, and UP3, to form the three information items 2. Therefore, as shown in FIG. 1, there are two stored copies of common portion CP1 that are redundant and consuming valuable storage space.

In the single-instance storage scheme of the present invention, redundant copies of common portion CP1 are not stored. The term "single-instance" refers to the fact that a common portion information is stored only once, even when a common portion is associated with a plurality of unique portions to form a plurality of information items.

Figure 2:
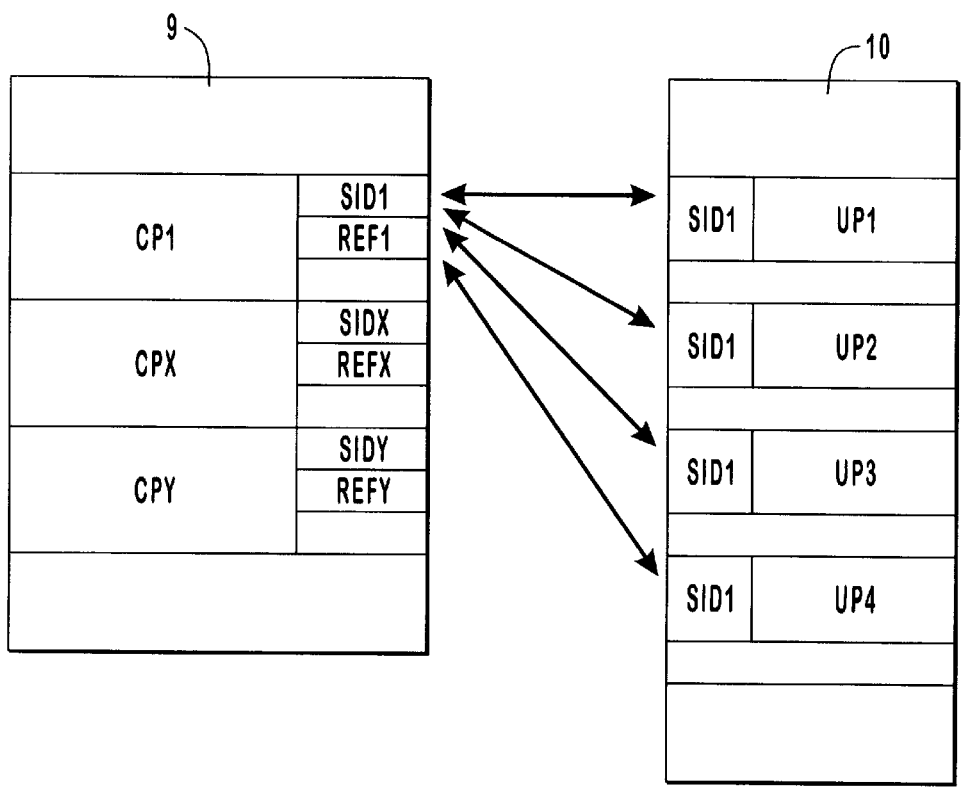
FIG. 2 is a block diagram of single-instance storage of information items.

A block diagram of the single-instance storage scheme is shown in FIG. 2. A common portion CP1 is stored in a first location 9 with other common portions, e.g., CPX and CPY. In one embodiment, first location 9 is a database and common portion CP1 is a database record having multiple fields. Unique portions UP1, UP2, and UP3 are stored in a second location 10. Second location 10 may also be a database with unique portions UP1, UP2, and UP3 being records of the database, and each unique portion having multiple fields. In one embodiment, the combination of a unique portion and common portion form a complete database record.

When common portion CP1 is stored, a globally unique single-instance identifier ("SID") is assigned to common portion CP1, e.g., SID1, and stored in first location 9 with common portion CP1. Additionally, SID1 is associated with each related unique portion UP1, UP2, and UP3 and stored with the respective unique portions. SID1 is globally unique, i.e., it uniquely identifies common portion CP1 throughout the computing system in which the storage scheme is implemented. The arrows shown in FIG. 2 designate the information items formed by the combination of common and unique portions.

A reference count ("REF") is stored with common portion CP1 (storing a reference count is not essential to practicing the invention). The reference count reflects the number of unique portions that are associated with common portion CP1. In the example of FIG. 2, the reference count, REF1, for common portion CP1 is three. If an information item is deleted from the system (e.g., unique portion UP3 is deleted), the reference count REF1 for common portion CP1 is decremented to two. Likewise, if a new unique portion UP4 is created and associated with common portion CP1 (by SID1), thereby forming a new information item, the reference count REF1 for common portion CP1 is incremented by one. As discussed further below, an attachment identifier may also be stored with common portion CP1.

Figure 3:
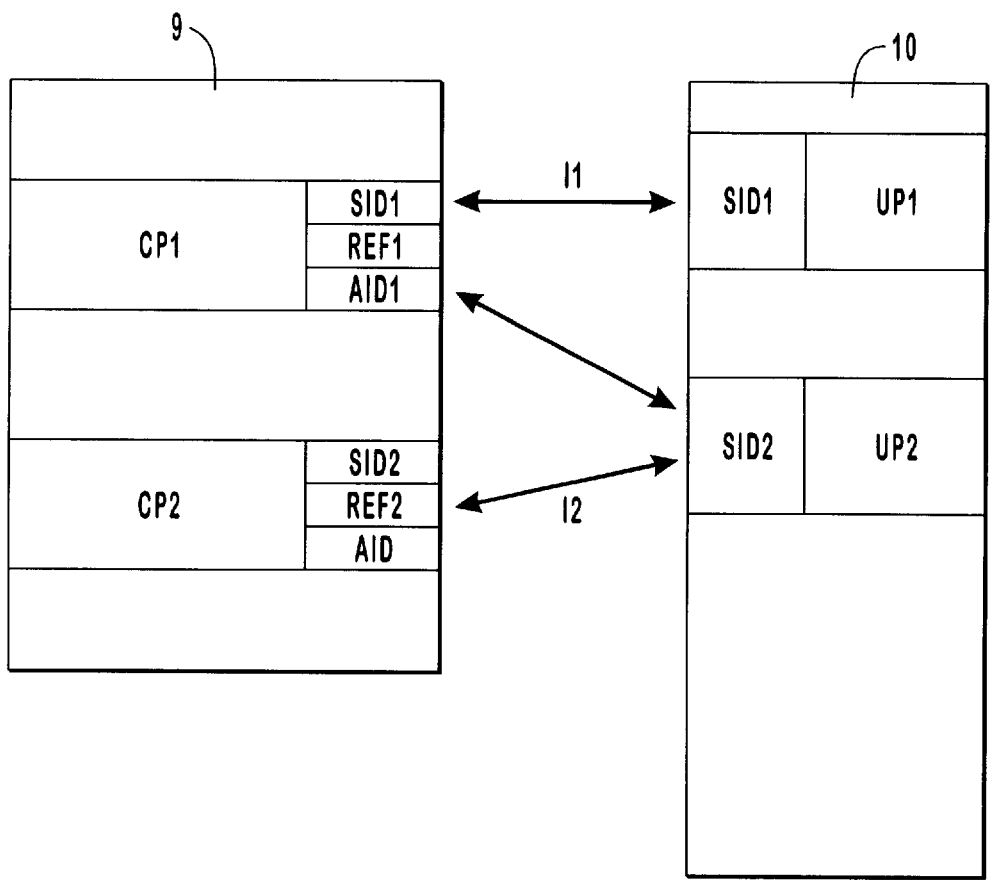
FIG. 3 is a block diagram of single-instance storage of information items.

The single-instance storage scheme works at multiple levels, as shown in the block diagram of FIG. 3. It may be advantageous to incorporate the information found in a second information item, I2, with the information of a first information item, I1. For example, information item I2 may contain a supporting schedule that is incorporated by reference in the information of common portion CP1 of information item I1. Also, information item I2 should be accessible independent of information item I1.

Information item I2 includes a common portion CP2 (e.g., containing the supporting schedule) and a unique portion UP2 associated by unique SID2. Therefore, information item I2 may be independently identified by referring to unique portion UP2. In order to associate or "attach" information item I2 to information item I1, an attachment identifier ("AID") is stored with common portion CP1. In one embodiment, an AID is merely the SID of the information item to be attached. In the example of FIG. 3, SID2 is used as the AID1 for common portion CP1.

Figure 4:
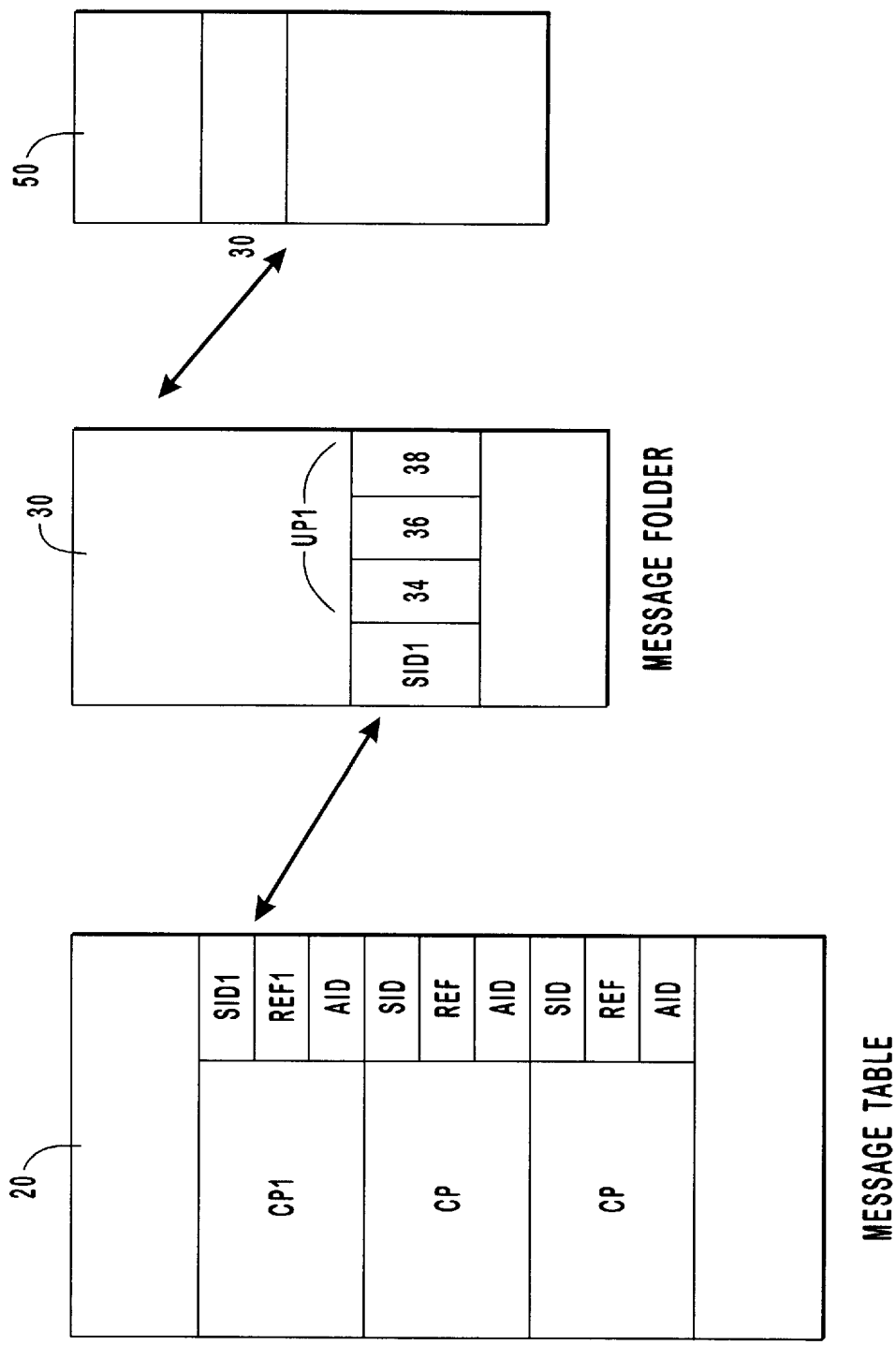
FIG. 4 is a block diagram of single-instance storage in an e-mail messaging system.

In one embodiment, single-instance storage is implemented in an e-mail messaging system operating in a client/server computing environment, e.g., Microsoft® Exchange. This computing environment may include multiple servers operably linked together. A block diagram of the e-mail single-instance storage scheme is shown in FIG. 4. The common portions, e.g., CP1, of e-mail messages are stored in message table 20. The common portions are typically the main body of an e-mail message and may include text or other data items. An SID is assigned to and stored with each common portion. For example, SID1 is assigned to CP1. Each SID is a unique identifier within the client/server computing system.

Implemented in a messaging system, the attachment scheme shown in FIG. 3 can be used to provide a message/ attachment hierarchy. A first message I1 can have the content of a second message I2 linked to it via the attachment identifier AID1 of its common portion CP1. The attachment identifier AID1 stores the single-instance identifier SID2 of the second message. Though not shown in FIG. 3, this hierarchy can continue through additional levels. For example, attachment identifier AID2 of the second message would contain the single-instance identifier of a third message, and so on.

Figure 5:
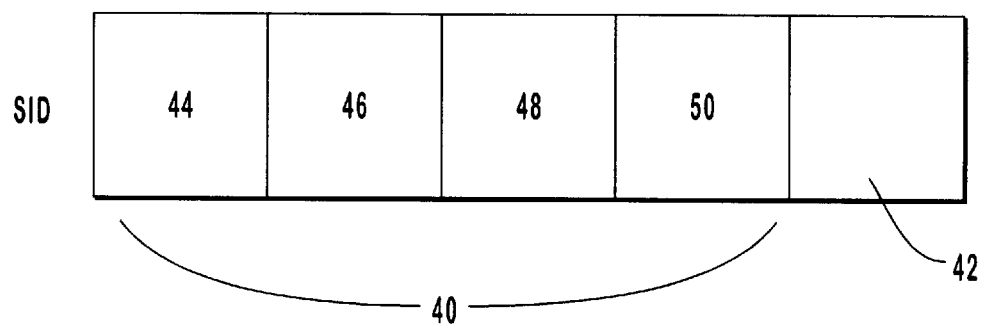
FIG. 5 is a block diagram of a single-instance identifier.

The data structure of a SID is shown in FIG. 5. Preferably, a SID includes a globally unique identifier ("GUID") 40 that uniquely identifies the server that is creating the SID. The GUID 40 is 16 bytes and includes four subparts: (1) a 60-bit system time 44; (2) a 4-bit version number 46; (3) a 16-bit clock sequence 48; and (4) a 48-bit network address 50. An implementation of a process which generates GUID values as explained above can be obtained from Microsoft Corporation. The implementation resides in the Windows 32-bit software development kit (WIN32SDK) as a program called UUIDGEN (hereby incorporated by reference). Since the 16-byte GUID value 40 is much larger than the actual number of servers in any given client/server computing system, the 16-byte GUID value can be compressed and stored locally in an abbreviated form.

A SID also includes a local counter value 42, e.g., a six-byte count. The length of the counter value 42 may be adjusted but should be sufficiently long to avoid a short term rollover problem. Rollover should be avoided in order to ensure unique SID values.

Referring again to FIG. 4, a reference count, e.g., REF1, is also stored with each common portion. The reference count operates as discussed above and reflects the number of unique portions of e-mail messages that are associated with each common portion. Also as discussed above, the reference count is incremented and decremented as unique portions that are associated with a common portion are created and deleted.

When a reference count reaches zero, e.g., REF1=0, there are no unique portions that are associated with common portion CP1. In other words, there are no longer any e-mail messages that include common portion CP1. Therefore, common portion CP1 may be deleted, saving additional storage space.

Experience shows that a unique portion may be created after the reference count of a common portion reaches zero, where the new unique portion references that common portion. Therefore, a common portion may not be deleted immediately upon its reference count reaching zero. A counter may be used to delay a predetermined amount of time before deleting a common portion after its reference count reaches zero. Also, other decision variables may be used to determine when to delete a common portion having a reference count of zero. Exemplary decision variables include the relative computing load of the system on which the storage scheme is operating and the size of the common portion.

Unique portions, e.g., UP1, of e-mail messages are stored in message folder 30. Message folder 30 may be accessed by a user through a folder 50. Each unique portion is associated with a single common portion by storing the SID of the associated common portion. For example, unique portion UP1 is associated with common portion CP1 by SID1.

A unique portion includes three types of information: unique information 34, view information 36, and cache information 38. Unique information 34 includes information that is unique to the e-mail message, such as the recipient of the message, date/time the message was delivered, and the read/unread status of the message. View information 36 includes information displayed to a user when a user accesses message folder 32 (e.g., sender, subject, message class, indicator that message has attachments, delivery time, and message size).

Cache information 38 may also be used for viewing or sorting. For example, a user may want to view or sort one or more fields of the associated common portion, e.g., the main body of the message. In one embodiment, only 255 characters (for string information) or 255 bytes (for binary-coded information) per field may be stored as cache information. For example, if the message body were selected as part of the cache information, only the first 255 characters would be stored as cache information. The entire message body would remain stored in the common portion. Also, since the cache information is duplicative of information already stored in the common portion, the cache information may be discarded after a predetermined time or according to other known "aging" techniques.

The following examples are illustrative of the operation of single-instance storage in an e-mail system and are exemplary of the advantages provided by the single-instance storage scheme. As a first example, an e-mail system user1 desires to copy a preexisting message to another location on the same server that the original message is stored. First, a new unique portion is created, designating the new location. The new unique portion is assigned the SID of the common portion of the preexisting message. The reference count of that common portion is then incremented by one.

In another example, user1 desires to move the e-mail message to a different location on the same server. A new unique portion is created to reflect the new location and the old unique portion is discarded. (Alternatively, the preexisting unique portion may be merely modified to reflect the new location.) The new unique portion is assigned the SID of the common portion. The reference count of the common portion remains unchanged (incremented by one for the reference from the new unique portion; decremented by one when the old unique portion is deleted).

The advantages of this process become readily apparent when a user, represented on the network as a mailbox, is moved from one server to another. It is likely that many of the common portions associated with the e-mail messages found in the user's mailbox stored on the first server, are also found on the second server. Therefore, when the user's mailbox is moved to the second server, the SID's of all of the messages in the mailbox stored on the first server are compared against an SID table stored on the second server. Many of the SID's will be found on the second server. Only those common portions having an SID that is not found on the second server will be copied on to the second server. Consequently, a substantially smaller amount of information needs to be copied to the second server and deleted from the first server.

In another example, user1 modifies the common portion of a preexisting message. The preexisting message is already stored with a common portion having a reference count of one and an associated unique portion. User1 modifies the common portion, creating a new common portion. When the user saves the new common portion, it is given a new SID and a reference count of one. Also, a new unique portion is associated with the new common portion. No adjustment to the reference count of the original common portion is needed.

Figure 6:
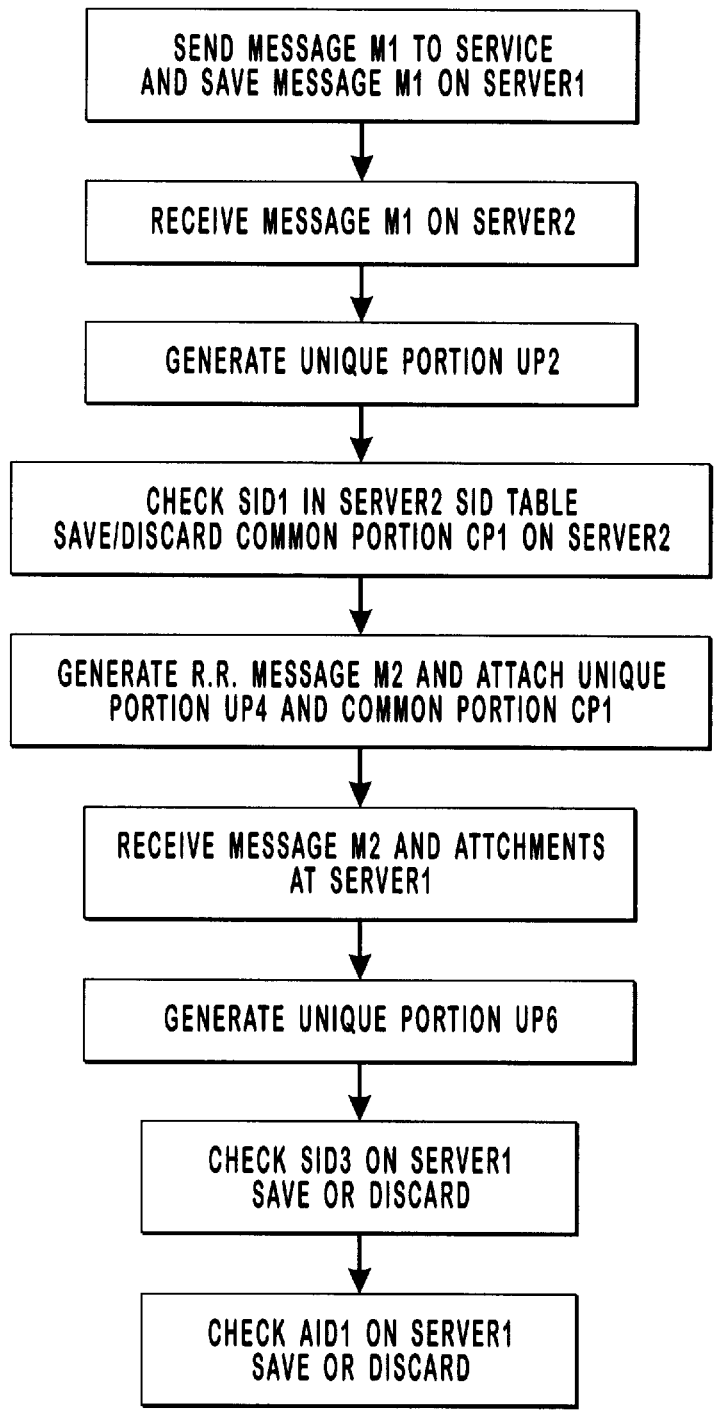
FIG. 6 is a flow diagram of a single-instance storage scenario.
Figure 7:
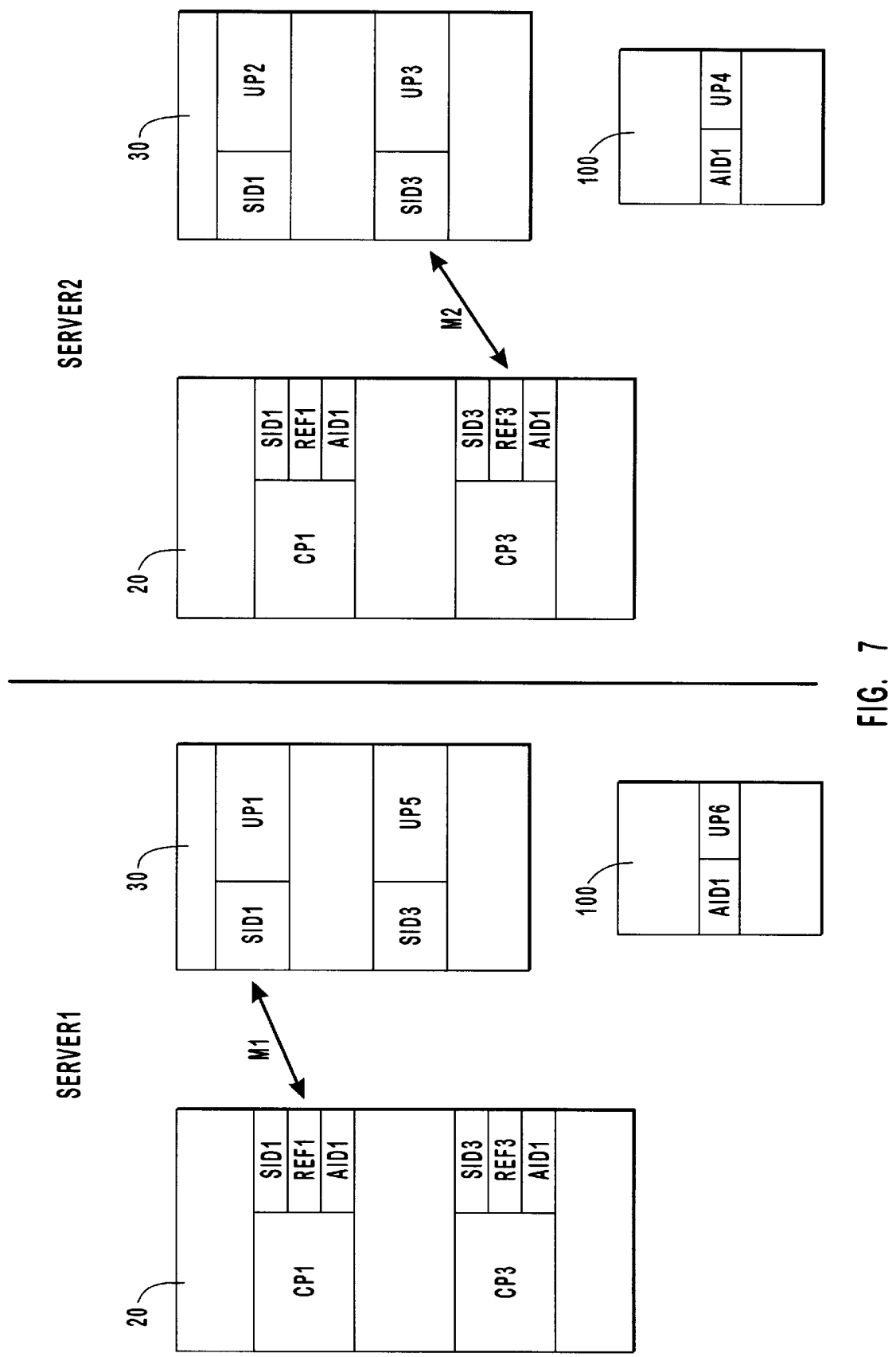
FIG. 7 is a block diagram of single-instance storage for the scenario of FIG. 6.

In another example, user1 on server1 desires to send a message to user2 on server2 and receive a delivery report message. Delivery report messages include the original message as an attachment. A flow diagram of this process is shown in FIG. 6, and a block diagram of the various message portions on server1 and server2 at the completion of this transaction are shown in FIG. 7. The original message M1 is saved at server1 as a unique portion UP1 and a common portion CP1, associated by SID1. Message M1 is transmitted, and user2 receives message M1 at server2. Server2 generates a new unique portion UP2 to identify message M1 on server2. SID1 is checked in an SID table on server2 and, if SID1 is not found, incoming common portion CP1 is copied on to server2. If SID1 is in the server2 SID table, incoming common portion CP1 is not copied on to server2.

Server2 automatically generates delivery report message M2. Message M2 includes a unique portion UP3 and a common portion CP3, associated by SID3. Attached to delivery report message M2 is the information of original message M1. The attachment is created by generating a unique portion UP4, stored in an attachment folder 100 on server2. Attachment folder 100 is of the same or similar format as message folder 30.

Unique portion UP4 must be associated with common portion CP1 of message M1 if the information of message M1 is to be attached to delivery report message M2 and transmitted to user1 on server1. SID1 is available to perform this function. However, as unique portion UP4 is part of an attachment to a message, SID1 is now referred to as attachment identifier ("AID"), e.g., AID1. An AID has the same format as an SID, but serves the specialized function of associating an attachment unique portion with a common portion.

Delivery report message M2, along with the attached information of original message M1, is transmitted to user1 on server1. When this transmission is received, server1 creates a new unique portion UP5 for the return receipt message M2, and stores with it SID3 to identify its associated common portion CP3. Server1 checks SID3 with the server1 SID table. As described above, the incoming common portion CP3 is discarded (if a match with SID3 is found) or stored (if a match is not found).

Server1 also creates an attachment unique portion UP6 in an attachment folder 100 on server1. Unique portion UP6 corresponds to attachment unique portion UP4 attached to delivery report message M2. Server1 checks AID1 with both an AID table on server1 and the SID table on server1. If a match is found (as will usually be the case for a return receipt message) then the incoming common portion CP1 will be discarded. If no match is found, common portion CP1 is saved on server1. Consequently, all common portions are stored only once on a server. A block diagram of the various message portions on server1 and server2 at the completion of this transaction are shown in FIG. 7.

The step of cross-referencing the SID of an incoming information item with the SIDs of preexisting information items may be used in a variety of situations to prevent duplicate information from being stored. Several of these situations are exemplified above.

Other embodiments are within the scope of the following claims.

We claim:

1. A method of reducing the space required to store information items that are transferred between a plurality of servers connected on a distributed network, the method comprising:
   (a) dividing an information item into a common portion and a unique portion, said common portion comprising information that is relatively unchanged when the information item is manipulated or transferred, and said unique portion comprising other information that is typically changed so as to generate further unique portions corresponding to the common portion, when the information item is manipulated or transferred;
   (b) assigning a single-instance identifier to the common portion that is globally unique across the plurality of servers so that said common portion can be uniquely identified on any server of the distributed network;
   (c) storing the uniquely identified common portion on the distributed network so that the uniquely identified common portion is not stored more that once on any given server of the distributed network; and
   (d) storing said unique portion and any said generated further unique portions along with a single-instance identifier so that on any given server, there is not more that one common portion independent of the number of corresponding unique portions stored on the same server.

2. The method of claim 1, wherein the information item comprises an electronic mail message.

3. The method of claim 2, wherein the unique portion comprises message read/unread status, recipient, and date/time created.

4. The method of claim 2, wherein the unique portion comprises the subject description of the electronic mail message.

5. The method of claim 2, wherein the unique portion comprises indexing or sorting information.

6. The method of claim 2, wherein the common portion comprises the body of the message.

7. The method of claim 2, wherein the common portion comprises an attachment identifier for linking an attachment to the information item.

8. The method of claim 7, wherein the attachment identifier comprises a single-instance identifier of a second information item, thereby forming a message/attachment hierarchy.

9. The method of claim 1, wherein the information item comprises a database record.

10. The method of claim 1, further comprising the step of assigning a reference count to the common portion based on the number of unique portions having the single-instance identifier assigned to the common portion.

11. The method of claim 10, further comprising the step of adjusting the reference count each time a unique portion having the single-instance identifier of the common portion is added or deleted.

12. The method of claim 11, further comprising the step of deleting the common portion after the reference count reaches zero.

13. The method of claim 11, further comprising the step of deleting the common portion a predetermined interval after the reference count reaches zero.

14. The method of claim 1, further comprising the steps of comparing the single-instance identifier of the common portion with single-instance identifiers of previously stored common portions, and discarding the common portion if its single-instance identifier matches a single-instance identifier of the previously stored common portions.

15. A computer program product, residing on a computer readable medium, for reducing the space required to store information items that are transferred between a plurality of servers connected on a distributed network, comprising:
   computer readable medium having computer executable instructions residing thereon, said computer executable instructions comprising:
   (a) means for dividing an information item into a common portion and a unique portion, said common portion comprising information that is relatively unchanged when the information item is manipulated or transferred, and said unique portion comprising other information that is typically changed so as to generate further unique portions corresponding to the common portion, when the information item is manipulated or transferred;
   (b) means for assigning a single-instance identifier to the common portion that is globally unique across the plurality of servers so that said common portion can be uniquely identified on any server of the distributed network; and
   (c) means for storing the uniquely identified common portion on the distributed network so that the uniquely identified common portion is not stored more than once on any given server of the distributed network; and
   (d) means for storing the unique portion and any said generated further unique portions along with said single-instance identifier so that on any given server, there is not more than one common portion independent of the number of corresponding unique portions stored on the same server.

16. The computer program product of claim 15, wherein the information item comprises an electronic mail message.

17. The computer program product of claim 16, wherein the unique portion comprises message read/unread status, recipient, and date/time created.

18. The computer program product of claim 16, wherein the unique portion comprises the subject description of the electronic mail message.

19. The computer program product of claim 16, wherein the unique portion comprises indexing or sorting information.

20. The computer program product of claim 16, wherein the common portion comprises the body of the message.

21. The computer program product of claim 15, wherein the information items comprise database records.

22. The computer program product of claim 15, wherein the instructions further comprise means for assigning a reference count to the common portion based on the number of unique portions having the single-instance identifier assigned to the common portion.

23. The computer program product of claim 22, wherein the instructions further comprise means for adjusting the reference count each time a unique portion having the single-instance identifier of the common portion is added or deleted.

24. The computer program product of claim 23, wherein the instructions further comprise means for deleting the common portion after the reference count reaches zero.

25. The computer program product of claim 23, wherein the instructions further comprise means for deleting the common portion a predetermined interval after the reference count reaches zero.

26. The computer program product of claim 15, wherein the instructions further comprise means for comparing the single-instance identifier of the common portion with single-instance identifiers of previously stored common portions, and discard the common portion if its single-instance identifier matches a single-instance identifier of the previously stored common portions.

27. The computer program product of claim 15, wherein the common portion comprises an attachment identifier for linking an attachment to the information item.

28. The computer program product of claim 27, wherein the attachment identifier comprises a single-instance identifier of a second information item, thereby forming a message/attachment hierarchy.

* * * * *

UNITED STATES PATENT AND TRADEMARK OFFICE
CERTIFICATE OF CORRECTION

PATENT NO. : 5,813,008
DATED : September 22, 1998
INVENTOR(S) : Max L. Benson; Darren A. Shakib It is certified that error appears in the above-identified patent and that said Letters Patent is hereby corrected as shown below:

Col. 7, Claim 1, Paragraph (b), first line, delete "assinging" and add --assigning--

Col. 7, Claim 1, Paragraph (d), second line, delete "a" and add --said--

Col. 7, Claim 1, Paragraph (d), fourth line, delete "that" and add --than--

Signed and Sealed this

Seventeenth Day of August, 1999

Attest:

Q. TODD DICKINSON

Attesting Officer

Acting Commissioner of Patents and Trademarks